US006421437B1

(12) United States Patent
Slutsman

(10) Patent No.: US 6,421,437 B1
(45) Date of Patent: Jul. 16, 2002

(54) SYSTEM AND METHOD FOR RE-DIRECTING INCOMING CALLS

(75) Inventor: Lev Slutsman, Wayside, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/431,405

(22) Filed: Nov. 1, 1999

(51) Int. Cl.⁷ .......................... H04M 3/42; H04M 3/54; H04M 7/00
(52) U.S. Cl. ............... 379/201.02; 379/201.12; 379/207.02; 379/211.02; 379/221.09; 379/221.14; 379/900
(58) Field of Search .................. 379/211.01, 211.02, 379/219, 220.01, 221.08, 221.09, 221.13, 221.14, 900, 201.02, 201.05, 201.12, 207.02

(56) References Cited

U.S. PATENT DOCUMENTS

| 5,473,677 A | 12/1995 | D'Amato et al. ....... 379/230 X |
| 5,598,464 A * | 1/1997 | Hess et al. ............. 379/211.03 |
| 5,724,412 A | 3/1998 | Srinivasan ............... 379/93.23 |
| 5,805,587 A | 9/1998 | Norris et al. ........... 379/230 X |
| 5,881,145 A * | 3/1999 | Giuhat et al. .......... 379/221.13 |
| 6,145,002 A * | 11/2000 | Srinivasan .................. 709/225 |

* cited by examiner

Primary Examiner—Harry S. Hong

(57) ABSTRACT

A system and method performs rerouting of an incoming call to a telecommunication services subscriber to provide intelligent network services based on proprietary data about the subscriber's services. This proprietary data is within the control of the telecommunication service provider's equipment. Rerouting is performed without providing access to the proprietary data by other telecommunication service providers. Using such a system and method the subscriber's telecommunication provider can effectively provide intelligent network services without risking dissemination of that proprietary data.

20 Claims, 4 Drawing Sheets

SYSTEM AND METHOD FOR RE-DIRECTING INCOMING CALLS

BACKGROUND OF THE INVENTION

1. Field of Invention

This invention relates to a system and method for re-directing incoming calls. More specifically, the invention relates to re-directing incoming calls to a provider originating switch to support Intelligent Network (IN) services in public switched telephone networks (PSTN) and Internet protocol (IP) domains.

2. Description of Related Art

As use of the Internet has grown, subscribers have become interested in receiving the same telephone services over the Internet that they presently enjoy over the PSTN. This has pushed telecommunication providers to provide services to their subscribers which make telecommunication contact easier and better in the Internet realm.

As telecommunication service providers seek to provide these new services, new techniques are being developed. For example, a commonly-owned patent, assigned to AT&T Corporation, U.S. Pat. No. 5,473,677, issued on Dec. 5, 1995 to D'Amato et al., which is hereby incorporated herein in its entirety, relates to providing real-time call control within a telecommunications network. Real-time call control is provided using a call selection processor which is separate from the switches that relay the call. The call selection processor responds to in-coming calls and uses information carried in the associated signaling messages to determine what application processor, if any, should be involved on the call. This permits selected calls to be differentiated from other calls so as to allow the selected calls to receive special treatment.

In enabling selected calls to be differentiated for special treatment, such features as call waiting have been implemented over the Internet. See, for instance, another commonly-owned patent, assigned to AT&T Corporation, U.S. Pat. No. 5,805,587 (incorporated herein in its entirety), issued on Sep. 8, 1998 to Norris et al., which relates to alerting a service subscriber whose telephone is connected to the Internet of a waiting call via that Internet connection. A waiting call to a subscriber may be forwarded via the PSTN to a services platform, which in turn establishes a connection to the subscriber using the Internet. The platform then notifies the subscriber of the waiting call via the Internet connection. The platform may then forward the telephone call to the subscriber via the Internet responsive to a subscriber request to do so without interrupting the subscriber's Internet connection.

Many subscribers of telecommunication service providers want Caller-ID as well. This is especially true in regard to the use of the service over the Internet. An attempt at providing this type of service was made in U.S. Pat. No. 5,724,412, issued on Mar. 2, 1998, to Srinivasan, which relates to providing a telephone service subscriber with Internet information related to a caller attempting to call the subscriber. Identification information relating to a caller attempting to call the subscriber is provided to the called party via the Internet after a caller has attempted to reach the called party.

Thus, Internet enabled IN services such as Internet call waiting, Caller-ID delivery, local number portability, CNAME, etc., have now become commonly available to service subscribers. These are IN services in that the incoming calls receive intelligent routing/treatment. Commonly, telecommunication service providers provide these Internet-enabled intelligent services. Implementing these services often requires access to a telecommunication service provider's service control point (SCP). This access is provided via a "database dip".

SUMMARY OF THE INVENTION

However, when the telecommunication service provider for the subscriber is different than the telecommunication service provider of the caller, who initiated the incoming call that is not a call to an 800 number, providing IN services, e.g., call-waiting, call-forwarding, or caller ID, some degree of access is required to information in the SCP, that is managed by the called party's telecommunication service provider. Access to such information by other telecommunication service providers is detrimental to the telecommunication service provider because such information is proprietary. Nevertheless, performance of certain IN services require use of that information. Therefore, the telecommunication service provider is faced with a difficult problem of protecting information while having to utilize that information to provide IN services for IP related uses.

The present invention provides a solution to such a problem. By providing a system and method that performs re-routing of an incoming call based on proprietary data within the control of the telecommunication service provider's equipment without having to provide access by other telecommunication service providers, the subscriber's telecommunication provider can effectively provide service without risking dissemination of that proprietary data.

In accordance with an illustrative embodiment of the present invention, an incoming call that requires IN services, such as call-routing or call-waiting, is re-routed to a service provider originating switch (POS) following receipt of the incoming call at the local exchange carrier (LEC) servicing the called subscriber. For example, if a LEC determines that the destination phone number for the incoming call is busy, the LEC reroutes the incoming call to the POS via a specific exchange number. In aPage: 4 more general sense, the service subscriber's LEC will implement a termination attempt trigger (TAT). This exchange number includes a real exchange number with dummy digits, meaning that there is not a telephone station with such a number, for the rest of the phone number. The POS recognizes that the exchange and dummy digits indicate a re-routed call coming from a LEC to the POS for rerouting using IN services.

As a result of this recognition, the POS parks the call and interacts with an SCP that performs a query regarding the called party's service information. This service information is stored in a database that stores information about the telecommunication subscriber's service information. As a result of that query, the SCP provides information to the POS on how to re-route the incoming call. Thus for systems that provide Internet Caller-ID Delivery Plus Service, such information may include an alternate phone number or alternate phone numbers which may receive the re-routed call. The SCP information may also include the priority of each of those alternative phone numbers.

As a result, the SCP query may not identify an alternative telephone-station to which the incoming call can be completed because, for example, there are no alternative telephone-stations listed in the database or none of the alternative telephone-stations are available to complete the call. In such a case, the SCP may analyze the information in the database to determine whether there is a universal resource locator (URL) where an additional alternative telephone-station or stations may be listed. The SCP then accesses the URL information using a web service control point (WSCP). Such a URL may be updated by the called party at his/her convenience. Such an updatable URL provides the opportunity for the called party to alter his/her information more easily so as to facilitate providing more effective IN services over the IP domain.

These and other features and advantages of this invention are described in, or are apparent from, the following description of the apparatus/systems and methods according to this invention.

BRIEF DESCRIPTION OF THE DRAWINGS

Various embodiments of this invention will be described in detail, with reference to the following figures, wherein.

DETAILED DESCRIPTION OF PREFERRED EMBODIMENTS

The present invention is useful in connection with a method and system for Internet Caller-ID Delivery Plus Service. In such a system, an incoming telephone call is received by a telecommunication service provider's POS, the telephone call having been routed to the POS by a local exchange carrier (LEC) in the area from which the telephone call was placed. The LEC can route the call to the POS if, for example: 1) the calling party is a subscriber of the telecommunication service provider; 2) the telephone station number called was an 800 number; or 3) the telecommunication service provider has a special arrangement with the LEC.

The POS attempts to contact the called party, i.e., the subscriber, via a primary telephone-station and any alternative telephone-station associated with the service subscriber. If attempts to reach the service subscriber via the telephone fail, the POS provides the option of leaving voice-mail for the called party at the primary telephone-station.

Figure 1:
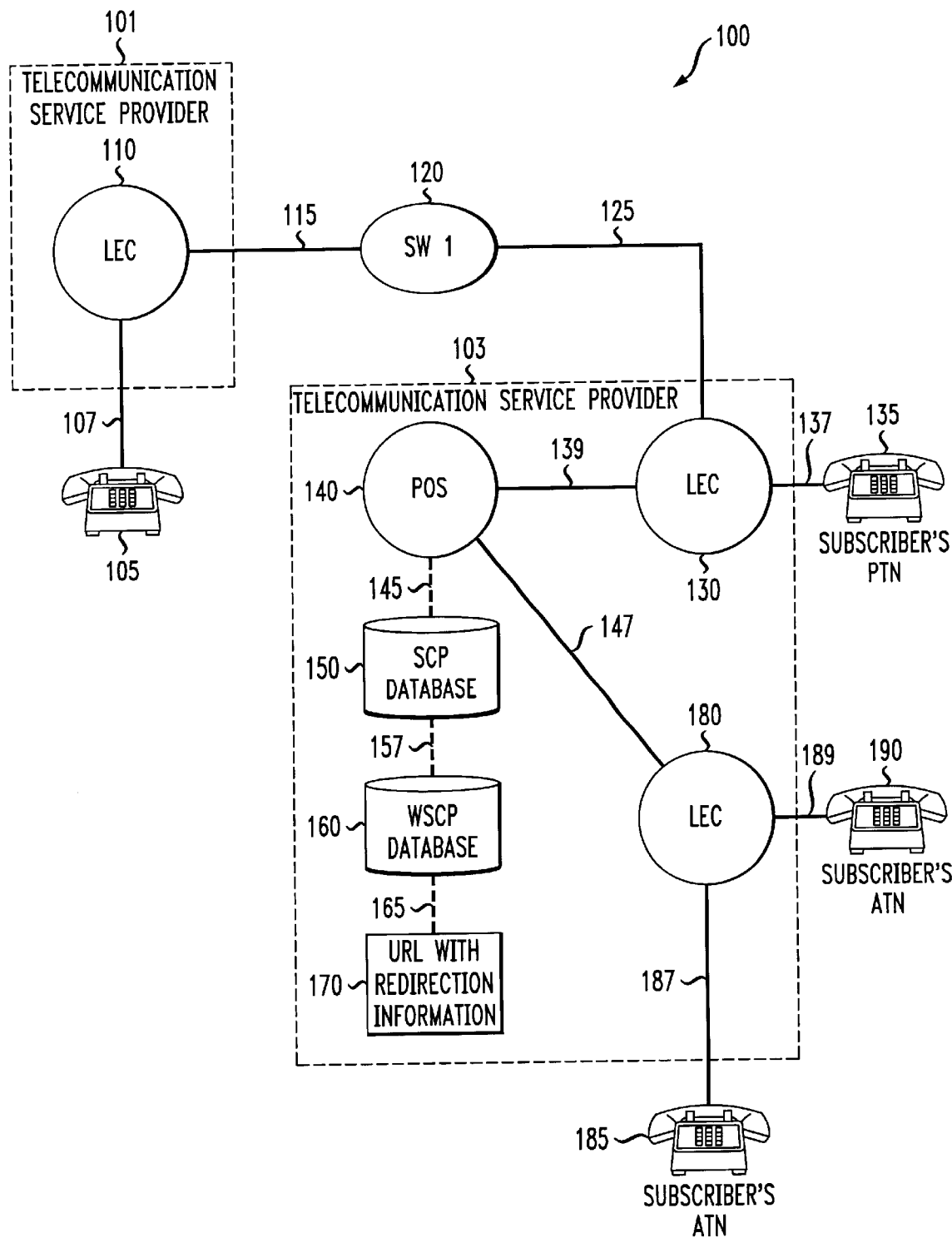
FIG. 1 shows a diagram of a communication system that provides IN services to a subscriber according to an exemplary embodiment of the invention.

FIG. 1 illustrates a telecommunication system 100 that provides IN services to a subscriber according to an exemplary embodiment of the invention. FIG. 1 depicts the interrelationship between two different telecommunication service providers 101 and 103 in delivering a call to a called party at any one of a number of telephone-stations 135 or alternative telephone-stations (ATN) 185 or 190 served by the first telecommunication service provider 103, from a calling party's telephone-station 105, served by a second telecommunication service provider 101. The calling party's telephone-station 105 is coupled to a LEC 110, operated by the second telecommunication service provider 101, via a transmission line 107. The LEC 110 is also coupled to a switch SW1 120 via a transmission line 115. The switch SW1 120 is owned by a telecommunication service provider other than the first telecommunication service provider 103.

The switch SW1 120 is also coupled to a LEC 130, operated by the first telecommunication service provider 103, via a transmission line 125. LEC 130 is coupled to the called party's primary telephone-station (PTN) 135 via a transmission line 137 and coupled to a POS 140 via a transmission line 139. This primary telephone-station 135 may be any type of telephone-station, e.g., landline telephone-station, cellular telephone-station, beeper, Internet telephone, etc. When the PTN 135 is not available for completion of the telephone call, the LEC 130 re-routes incoming calls to the POS 140 via the transmission line 139. The LEC 130 may either be operated by the first telecommunication service provider 103 or have some arrangement with the first provider 103 to perform this rerouting.

The POS 140 is operated by the first telecommunication service provider 103. The POS 140 is coupled to an alternate LEC 180 via a transmission line 147. The alternate LEC 180 is also either operated by the first telecommunication service provider 103 or has some agreement with the first provider 103. The alternate LEC 180 is coupled to the called party's alternate telephone-station (ATN) 185 via a transmission line 187 and the ATN 190 via transmission line 189. The ATNs 185 and 190 may be any type of telephone-station, e.g., landline telephone-station, cellular telephone-station, beeper, Internet telephone, etc.

The LEC 130 includes a router (not shown in FIG. 1) which is a software instrument that, under specified conditions, forwards, i.e., triggers, a call to the POS 140. For example, an incoming call is triggered to the POS 140 if the called party has subscribed to IN services provided by the first telecommunication service provider 103 and the called party's telephone-station is busy or not answering. The router routes the incoming call to the POS 140 with a dummy exchange number or the like, e.g., 836-0000, to indicate that the call being routed to the POS 140 is subject to IN servicing.

The POS 140 is also coupled to an SCP 150 via a transmission line 145 that is an SS7 signaling path. The SCP 150 contains a database that includes information about the IN services subscribed to by the called party. The POS 140 queries the database of the SCP 150 to determine any alternative telephone numbers for the called party based on the telephone number of the PTN 135 called for the incoming call. The database of the SCP 150 contains the PTN, i.e., the primary telephone-station number dialed by the calling party, and ATNs for the called party. Thus, for example, if the calling party is attempting to reach the called party at the PTN 135, the POS 140 will find that the service subscriber may have ATNs 185, 190 at which he/she may be reached.

Further, the database may also contain further information relating to the service subscriber including Internet based routing information, for example, an IP address of a URL that may be accessed using WSCP 160. The SCP 150 is coupled to the WSCP 160 via a transmission line 157, which is a signaling path. The WSCP 160 is also coupled to a URL 170 via a transmission line 165, which is also a signaling path. The URL 170 contains information about additional ATN 190, besides the ATN 185, to which an incoming call may be routed through transmission lines 189 or 187, respectively.

When the PTN 135 is dialed, the list of ATNs is retrieved from the SCP 150. Each of the PTN 135 and the ATN 185 are dialed beginning with the PTN. A line is considered to be unavailable for connection if the call is not answered after a specified number of rings or the telephone station is busy. The incoming call is connected to the first available line.

Subsequent to attempting call completion using the PTN 135 and ATN 185 listed in the database of the SCP 150, any URL 170 information is retrieved from the SCP 150. The URL information is then retrieved using the WSCP 160 and any resulting additional ATN 190 is used to attempt to complete the call. If the call cannot be completed, the call may be rerouted back to the PTN 135 to leave a voice mail or answering machine message.

The primary function of the system 100 is to support the incoming calls to the service subscriber. If a voice connection is available along the transmission line 137, the LEC 130 will route the call to the PTN 135 on the transmission line 137. Otherwise, the LEC 130 routes the incoming call to the POS 140 via the transmission line 139. The POS 140 then routes the incoming call to the SCP 150 which provides instructions to the POS 140 to connect the incoming call to the service subscriber, using one of the provided ATN 185 listed in the database in the SCP 150. Should subsequent attempts to connect the incoming call using one of the provided ATN 185 fail, the SCP 150 commands the POS 140 to disconnect the caller from the SCP 150 and connect to its Web counter-part WSCP 160.

To accomplish this, the SCP database is populated with a database with records for service subscribers. Each record in the database must have the service subscriber's PTN as a key column, and may include a list of ATNs 185 in the order desired, such as an office number, to be used to reach the service subscriber. The database record may also include the URL that lists additional information about the service subscriber's present location.

Figure 2:
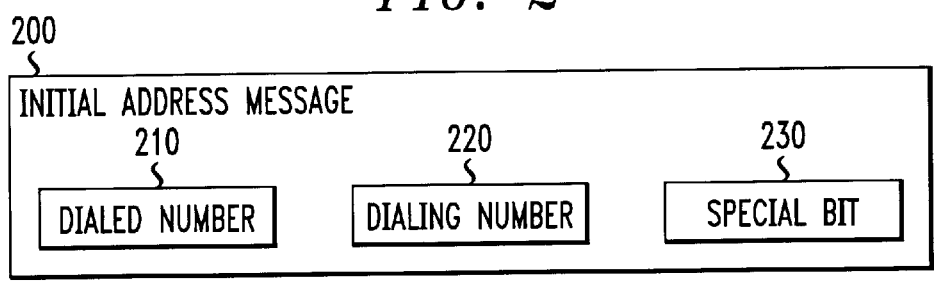
FIG. 2 shows a diagram of a data packet format used in conjunction with the exemplary embodiment of the present invention.

An exemplary embodiment of the invention is preferably used in conjunction with Signaling System Number 7 (SS7) networks. In the SS7 network, a message is sent in the forward direction as part of an ISUP (ISDN user Part) call to set-up protocol. FIG. 2 illustrates the initial address message (IAM) 200 for an incoming telephone call. The IAM 200 is a mandatory message which initiates capture of an outgoing circuit and which transmits address and other information relating to the routing and handling of the incoming call.

As shown in FIG. 2, the IAM 200 contains information about the incoming call including the dialed number 210, the dialing number 220 and a special bit 230. The dialed number 210 is the called party's PTN or 135 in FIG. 1. The dialing number 220 is the calling number information (CNI), also known as calling line identification (CLI). The CNI is the telephone-station number of the calling party 105, which is sent to the called party for identification purposes. Many service providers also support Caller Name, which transmits the name of the calling party along with the originating telephone number. A special bit 230 is also included that is used in the exemplary embodiment of the invention to indicate that the re-routed incoming call is a re-routed call that has already traversed a POS 140 operated by the telecommunication service provider 103. When the incoming call traverses the LEC 130, the special bit 230 is set to indicate that the call is an incoming call that is being sent to a POS operated by the telecommunication service provider 103. This set special bit 230 also indicates subsequently that the incoming call has already been routed to the POS operated by the telecommunication service provider 103.

Figure 3:
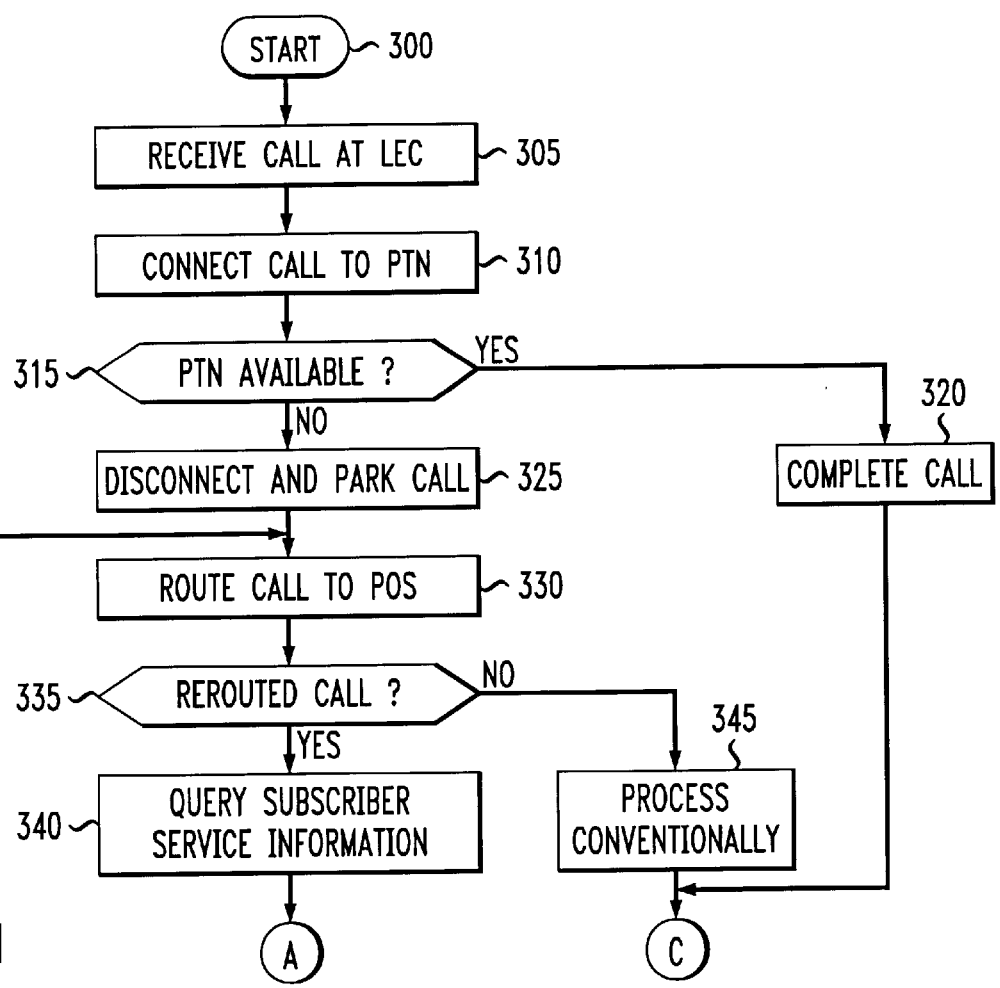
FIGS. 3 and 4 show flowcharts of the steps in a telecommunication method that provide IN services to a subscriber according to the exemplary embodiment of the invention.
Figure 4:
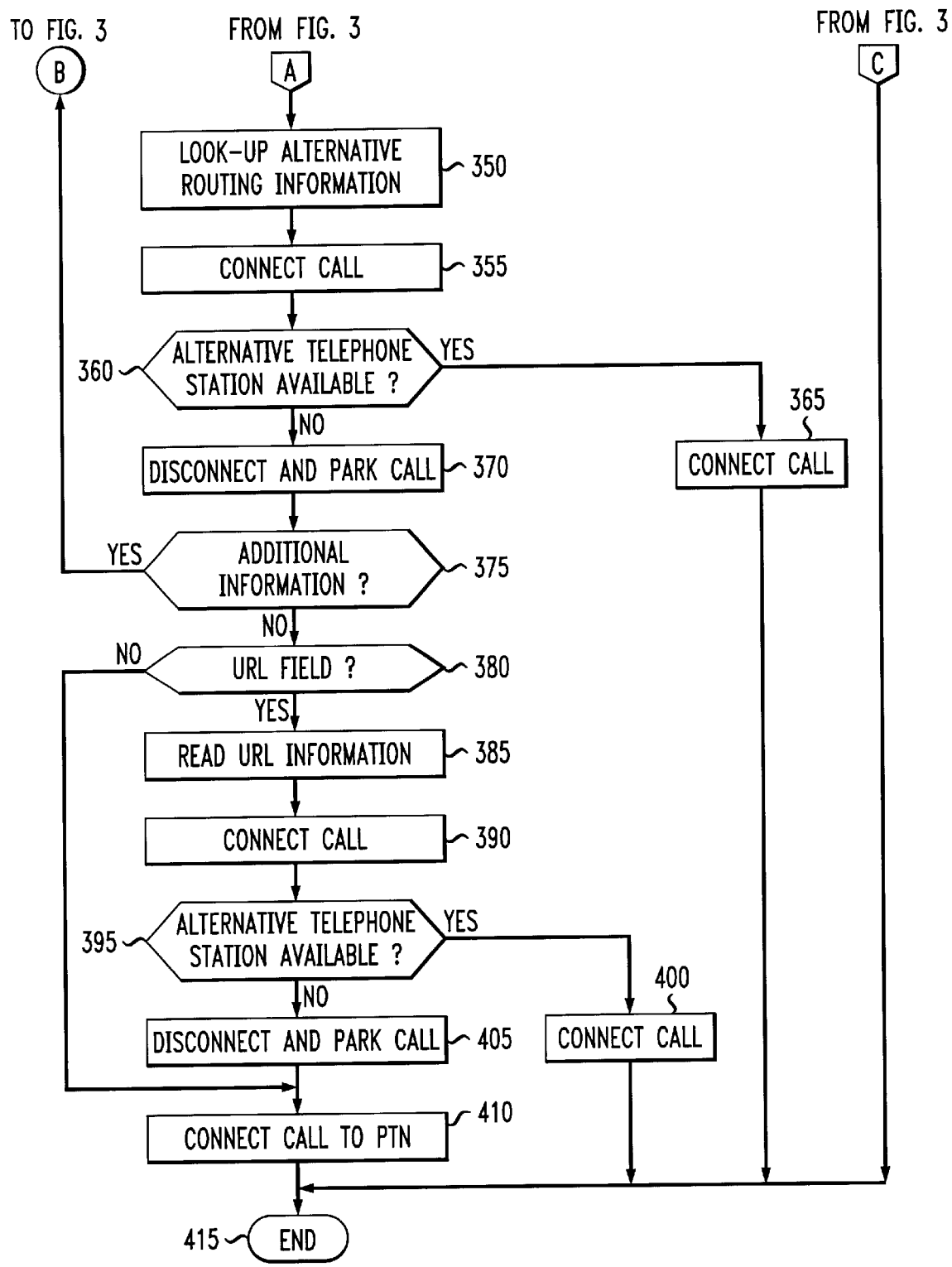

FIGS. 3 and 4 illustrate a method for routing an incoming telephone call in accordance with an exemplary embodiment of the invention.

The method begins in step 300 and control proceeds to step 305 for receiving a call at a LEC. In step 305, the incoming call is received at a terminating LEC that is to connect the incoming call to the called party's PTN and control proceeds to step 310. In step 310, the LEC connects the incoming call to the called party's PTN and control proceeds to step 315. In step 315, the LEC determines whether the PTN is available for call completion. If the PTN is available for completion of the incoming call, control proceeds to step 320 in which the LEC completes the incoming call with the PTN and control proceeds to step 415 in FIG. 4, where the method ends. The operation of completing a call is the act of receiving an answer at the telephone-station, thereby eliminating the need for re-routing.

Otherwise, control proceeds to step 325 in which the LEC disconnects the incoming call from the PTN, parks the incoming call and sets the special bit 230 in the IAM to indicate that the call is subject to call forwarding. Control then proceeds to step 330 in which the LEC reroutes the incoming call to the POS with a fictitious number using an exchange code of a desired POS (Local Routing Number (LRN)).

This routing to the POS is performed by the terminating LEC forwarding the incoming call using a virtual telephone-station number with an exchange code of the desired POS (Local Routing Number (LRN)), e.g., 836, followed by a series of dummy characters, e.g., 0000. Thus, the LEC routes the incoming call to the POS using the virtual telephone number, e.g., 836-0000.

Control then proceeds to step 335. In step 335, the POS determines whether the IAM relates to an incoming call that has been rerouted from the LEC by analyzing the forwarding number, e.g., 836-6400, used by the LEC to route the incoming call to the POS. If the forwarding number indicates a rerouted incoming call, control proceeds to step 340. Otherwise control proceeds to step 345 in which non-rerouted calls are processed in a conventional manner and to step 415 in FIG. 4 in which the method ends.

In step 340, the POS then queries the SCP using the PTN information stored in the called party's information 210 of the IAM 200 as the key and control proceeds to step 350 (of FIG. 4). In step 350, the SCP looks up the alternative routing information in the SCP database and control proceeds to step 355. For example, the information within the database indicates any services to which the subscriber has subscribed and any ATNs to which incoming calls may be routed, listed in order of priority. In step 355, the incoming call is connected in accordance with the highest priority ATN information stored in the SCP and control proceeds to step 360. For example, in step 355, the incoming call may be connected through a LEC to an ATN.

In step 360, it is determined whether the call can be completed in accordance with the highest priority ATN, e.g., based on the availability of the first alternate telephone-station. If the first ATN is available, control proceeds to step 365 where the call is completed at the first ATN and control proceeds to step 415 where the method ends. Otherwise, control proceeds to step 370 where the incoming call is disconnected from the first ATN and the incoming call is parked. Control then proceeds to step 375.

Step 375 determines whether additional ATNs are listed in the SCP database and may be used to forward the incoming call. If additional ATNs are available, control proceeds to step 330 in FIG. 3 for routing based on the remaining ATN information. Steps 330–375 are performed for the ATNs listed in the SCP database in order of priority. If during the call-forwarding of steps 330–375, the incoming call is completed, control proceeds to step 415 where the method ends.

Otherwise, control proceeds to step 380 in which it is determined whether a URL field in the database identifies a URL that contains information about the present location of the subscriber, such as further alternative telephone numbers. If the field fails to indicate a URL, control proceeds to step 410 where the incoming call is routed to the PTN so that the calling party may leave an answering machine message or voice-mail, if those are options or services offered by the called party. Control then proceeds to step 415 where the method ends.

If the field indicates a URL, control proceeds to step 385, in which the ATN information at the URL are returned for use in call-forwarding. Control then proceeds to step 390. In step 390, the incoming call is routed to a LEC and connected to the highest priority ATN based on the information at the URL, e.g., information about the subscriber's present location. Control then proceeds to step 395 in which it is determined whether the highest priority ATN is available. If the ATN is available, control proceeds to step 400 where the call is completed at the ATN and control proceeds to step 415 where the method ends. Otherwise, control proceeds to step 405 where the incoming call is disconnected from the ATN and the incoming call is parked. Control then proceeds to step 410 where the POS routes the incoming call to the PTN so that the calling party may leave an answering machine message or voice-mail, if those are options or services offered by the called party. Control then proceeds to step 415 where the method ends.

Figure 5:
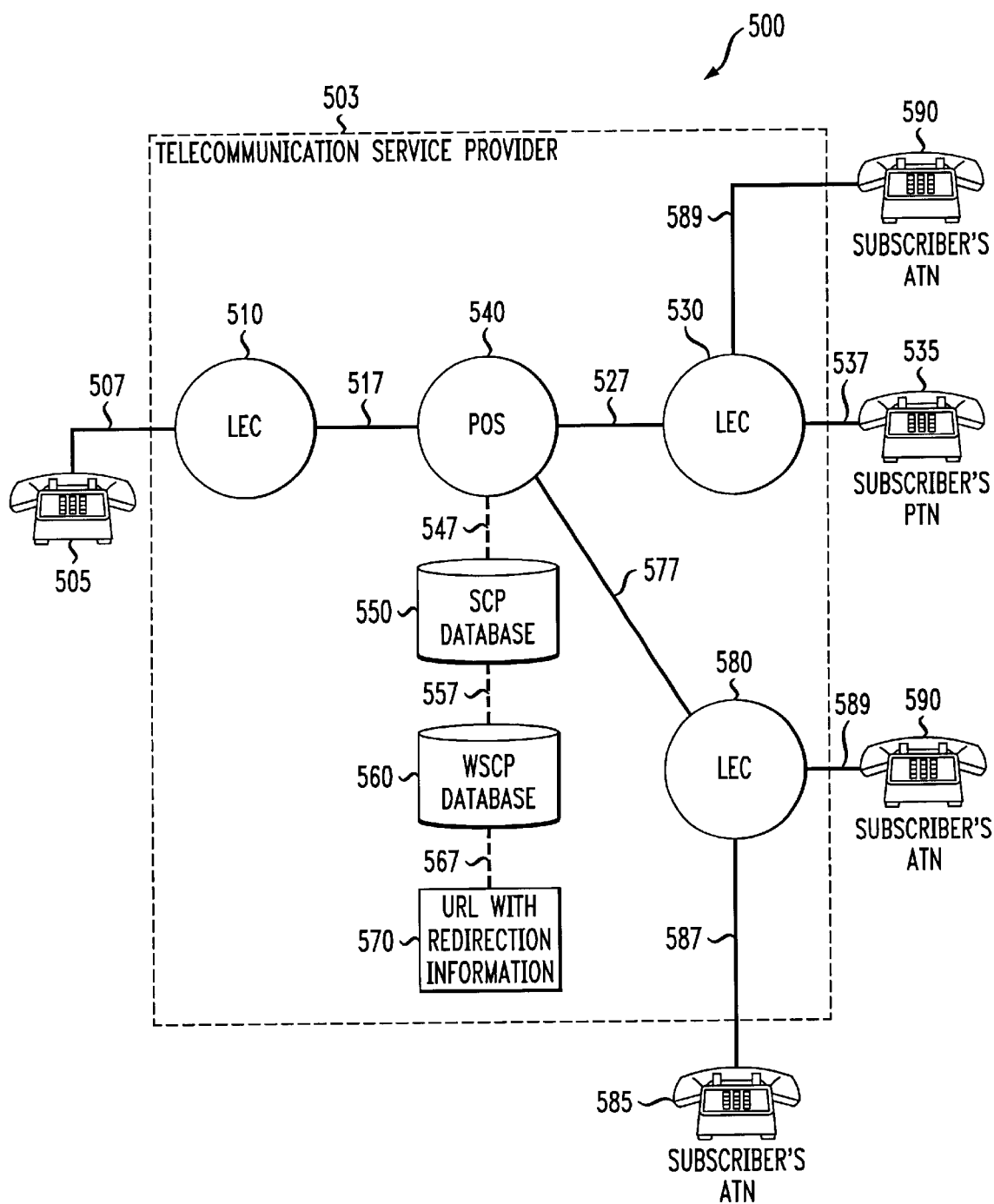
FIG. 5 shows a diagram of a telecommunication system that provides IN services to a subscriber according to an exemplary embodiment of the invention.

FIG. 5 shows a telecommunication system 500 that provides IN services to a subscriber according to another exemplary embodiment of the invention. Unlike FIG. 1, FIG. 5 actually depicts the telecommunication system structure operated by a single telecommunication service provider 503. Thus, in FIG. 5, an incoming call is delivered from a calling party's telephone-station 505 to a called party served by the same telecommunication service provider 503. The calling party's telephone-station 505 is coupled to a LEC 510 via a transmission line 507.

The LEC 510 is also coupled to a POS 540 via a transmission line 517. The POS 540 is also coupled to a LEC 530 via a transmission line 527 and a LEC 580 via a transmission line 577. Each of LEC 530 and LEC 580 is either operated by the telecommunication service provider 503 or has some agreement with the service provider 503 to perform rerouting for IN services. LEC 530 is coupled to the called party's telephone-station 535 via a transmission line 537. LEC 580 is coupled to the called party's ATN 585 via a transmission line 587. These telephone-stations 535 and 585 may be any type of telephone-station, e.g., landline telephone-station, cellular telephone-station, beeper, Internet telephone, etc.

The POS 540 is operated by the telecommunication service provider 503 that provides services to which the incoming call is directed. The POS 540 is coupled to an SCP 550 via a transmission line 547. The SCP 550 is also coupled to a WSCP 560 via a transmission line 557. The WSCP 560 is also coupled to a URL 570 via a transmission line 567. The URL 570 contains information about additional ATNs 590, besides the telephone-station 585, to which an incoming call may be routed through transmission lines 589.

IN services are provided to a subscriber in the architecture illustrated in FIG. 5 in a method very similar to how IN services are provided in the architecture of FIG. 1. However, one significant difference is that the LEC 530 does not set the special bit 230 in the IAM of FIG. 2. This is because the incoming call has already traversed the POS 540 before the incoming call reaches the LEC 530. Therefore, before the LEC 510 routes the incoming call through the POS 540, the LEC 510 sets the special bit 230 in the IAM 200 to indicate that the incoming call has been routed through the POS 540 and the POS 540 in turn routes the incoming call to the terminating LEC 530 of the PTN 535. The remaining methodology for forwarding the incoming call using the system 500 is similar to that illustrated in FIG. 1 and described in conjunction with FIGS. 3 and 4.

While the present invention has been described with reference to specific embodiments, it is not confined to the specific details set forth but is intended to cover such modifications or changes as may come within the scope of this invention.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

For example, the relationship between the alternative telephone-station 185 and the POS 140 may be altered. Specifically, it is foreseeable that the ATNs 185 or 190 may be coupled to the first LEC 130 rather than the second LEC 180.

Additionally, the SCP or URL may include IP address information for the subscriber so that an electronic mail message may be left at the address indicating information about the call that was not completed. Such information may include an electronic message from the called party.

Also, Page: 15 although the operation of the present invention has been explained using the application of providing Caller-ID delivery, it is foreseeable that other triggers besides termination attempt trigger (TAT) may be used to cause re-routing, for example, when providing call-forwarding on receipt of a busy signal.

Accordingly, the exemplary embodiments set forth herein are intended to be illustrative, not limiting. Various alterations may be made without departing from the spirit and scope of the invention.

What is claimed is:

1. A method for rerouting incoming calls to a subscriber comprising:

receiving an incoming call, wherein routing information for the incoming call indicates that the incoming call is to be completed at a subscriber's primary telephone-station number;

determining whether the incoming call can be completed at the subscriber's telephone-station number;

determining whether the subscriber has subscribed to the intelligent network services;

rerouting the incoming call to a provider originating switch operated by a first telecommunication service provider that provides the intelligent network services to the subscriber if the incoming call cannot be completed at the subscriber's primary telephone-station number and the subscriber has subscribed to intelligent network services;

identifying alternate telephone-station number information; and further rerouting the incoming call based on the alternate telephone-station number information, wherein, the incoming call originated at a local exchange carrier is serviced by a second telecommunication service provider and wherein the steps of determining whether the subscriber has subscribed to the intelligent network services, rerouting the incoming call to a provider originating switch, identifying the subscriber's alternate telephone-station number information and further rerouting the incoming call based on the alternate telephone-number information are performed without providing access by the second telecommunication service provider to the information about the subscriber's service.

2. The method for rerouting incoming calls of claim 1, wherein identifying alternate telephone-station number information is performed by accessing a database located at a service control point managed by the first telecommunication service provider.

3. The method for rerouting incoming calls of claim 2, wherein the alternate telephone-station number information includes more than one alternate telephone-station number for the subscriber as well as a priority of each of the alternate telephone-station numbers.

4. The method of rerouting incoming calls of claim 2, wherein identifying alternate telephone-station number information further comprises:
   identifying a universal resource locator address in the database; and
   identifying additional alternate telephone-station number information stored at the universal resource locator.

5. The method of rerouting incoming calls of claim 4, wherein identifying additional alternate telephone-station number information is performed using a web service control point.

6. The method of rerouting incoming calls of claim 4, wherein the additional alternate telephone-station number information stored on the universal resource locator is updatable by the subscriber.

7. The method of rerouting incoming calls of claim 1, further comprising identifying whether a call received by the provider originating switch is a rerouted incoming call based on a dummy exchange number used to reroute the incoming call from the local exchange carrier to the provider originating switch.

8. The method of rerouting incoming calls of claim 1, further comprising, following receipt of the rerouted incoming call from the local exchange carrier, determining whether the rerouted incoming call has traversed a provider originating switch operated by the first telecommunication service provider, such determining being performed by identifying a special bit of a message forwarded with the rerouted incoming call from the local exchange carrier.

9. The method of rerouting incoming calls of claim 2, further comprising completing the call based on the alternate telephone-station number inflation stored in the database located at the service control point.

10. The method of rerouting incoming calls of claim 4, further comprising completing the call based on the additional alternate telephone-station number information stored in the database located at the universal resource locator.

11. A telecommunication service system providing intelligent network services, the system comprising:
   a provider originating switch that receives incoming calls rerouted from a subscriber's primary telephone-station number by a local exchange carrier if the local exchange carrier cannot complete the incoming call at the subscriber's primary telephone-station number and the subscriber has subscribed to intelligent network services provided by a first telecommunication service provider;
   a service control point coupled to the provider originating switch, the service control point including a database that stores information about the intelligent network services to which the subscriber has subscribed;
   wherein, the provider originating switch further reroutes the rerouted incoming call to an alternate telephone-station number based on the alternate telephone-station routing information stored in the database of the service control point and the provider originating switch and service control point are operated by the first telecommunication provider;
   a web service control point coupled to the provider originating switch and the service control point, the web service control point being operated by the first telecommunication provider; and
   a universal resource locator coupled to the web service control point, the universal resource locator including additional information about the intelligent network services to which the subscriber has subscribed.

12. The system of claim 11, wherein the provider originating switch reroutes the incoming call to an alternate telephone-station number based on the additional alternate telephone-station routing information stored at the URL.

13. The system of claim 11, wherein the alternate telephone-station routing information stored in the database of the service control point includes more that one alternate telephone-station number for the subscriber as well as a priority of each of the alternate telephone-station numbers.

14. The system of claim 11, wherein the incoming call originated at a local exchange carrier is serviced by a second telecommunication service provider.

15. The system of claim 14, wherein intelligent network services are provided to the subscriber without providing access by the second telecommunication service provider to the alternate telephone-station n routing information stored in the database of the service control point.

16. The system of claim 12, wherein intelligent network services are provided to the subscriber without proving access by the second telecommunication service provider to the additional alternate telephone-station routing information stored at the universal locator.

17. The system of claim 12, wherein the additional alternate telephone station routing information stored at the universal resource locator includes an alternate telephone station number for the subscriber.

18. The system of claim 11, wherein the additional alternate telephone station number information stored on the universal resource location or updatable by the subscriber.

19. The system of claim 11, wherein the provider originating switch identifies a rerouted incoming call to be further rerouted based on a dummy exchange number used to reroute the incoming call from the local exchange carrier to the provider originating switch.

20. The system of claim 11, wherein the provider originating switch determines whether the rerouted incoming call has traversed a provider originating switch operated by the first telecommunication service provider by identifying a special bit of a message forwarded with the rerouted incoming call from the local exchange carrier.

* * * * *